US008184609B2

(12) United States Patent
Khan et al.

(10) Patent No.: US 8,184,609 B2
(45) Date of Patent: May 22, 2012

(54) SYSTEM AND METHOD FOR RANDOM ACCESS IN A WIRELESS COMMUNICATION SYSTEM

(75) Inventors: Farooq Khan, Allen, TX (US); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 949 days.

(21) Appl. No.: 11/835,569

(22) Filed: Aug. 8, 2007

(65) Prior Publication Data

US 2008/0049708 A1 Feb. 28, 2008

Related U.S. Application Data

(60) Provisional application No. 60/840,202, filed on Aug. 25, 2006.

(51) Int. Cl.
*H04J 1/00* (2006.01)
(52) U.S. Cl. .......................... 370/343; 370/319; 370/320
(58) Field of Classification Search ........................ None
See application file for complete search history.

(56) References Cited

U.S. PATENT DOCUMENTS

| | | | | |
|---|---|---|---|---|
| 7,643,832 | B2 * | 1/2010 | Cudak et al. .................. | 455/450 |
| 2005/0237989 | A1 * | 10/2005 | Ahn et al. ...................... | 370/343 |
| 2006/0039451 | A1 * | 2/2006 | Zhuang et al. ................. | 375/145 |
| 2006/0291470 | A1 * | 12/2006 | Khandekar et al. ......... | 370/395.1 |
| 2007/0230600 | A1 * | 10/2007 | Bertrand et al. ............... | 375/260 |
| 2007/0254685 | A1 * | 11/2007 | Oketani et al. ................. | 455/500 |
| 2008/0049672 | A1 * | 2/2008 | Barak et al. .................... | 370/330 |
| 2008/0075195 | A1 * | 3/2008 | Pajukoski et al. ............. | 375/298 |
| 2008/0095254 | A1 * | 4/2008 | Muharemovic et al. ....... | 375/260 |
| 2008/0123616 | A1 * | 5/2008 | Lee ................................ | 370/344 |
| 2009/0135803 | A1 * | 5/2009 | Luo et al. ....................... | 370/350 |
| 2010/0099423 | A1 * | 4/2010 | Ogawa et al. ................. | 455/450 |
| 2010/0173642 | A1 * | 7/2010 | Iwai et al. ...................... | 455/450 |

* cited by examiner

*Primary Examiner* — Chi Pham
*Assistant Examiner* — Kouroush Mohebbi

(57) ABSTRACT

The present disclosure relates generally to systems and methods for random access in a wireless communication system. In one example, the method includes allocating first and second random access orthogonal frequency subbands to first and second subdivisions, respectively, in a wireless communication network. The first subband is assigned to a first position in a first subframe for use in the first subdivision during a first transmission slot, and the second subband is assigned to a second position in the first subframe for use in the second subdivision during the first transmission slot. The first subband is then assigned to a third position in a second subframe for use in the first subdivision during a second transmission slot following the first transmission slot, and the second subband is assigned to a fourth position in the second subframe for use in the second subdivision during the second transmission slot.

21 Claims, 11 Drawing Sheets

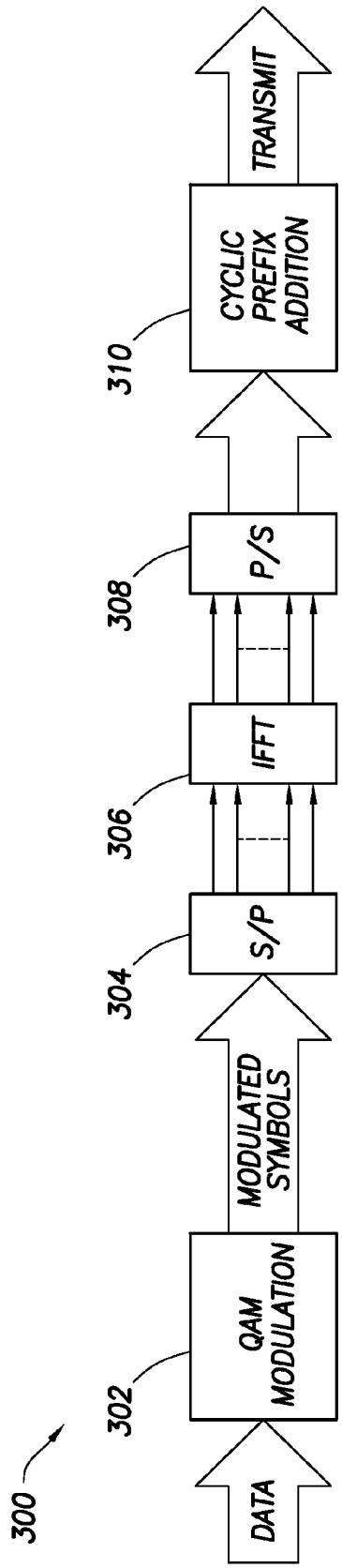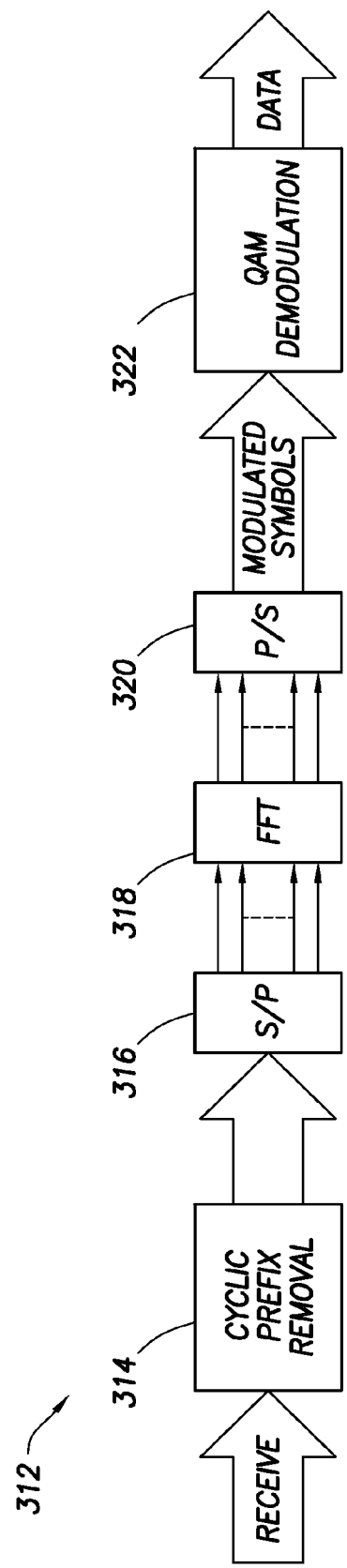

FIG.9
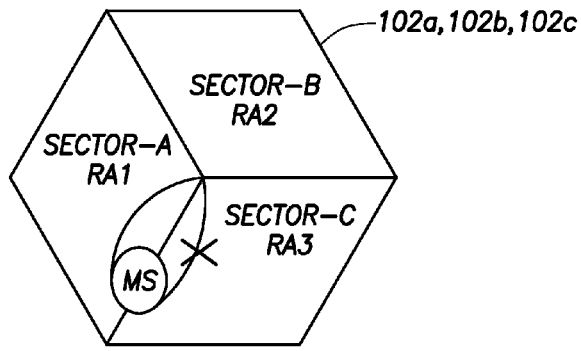
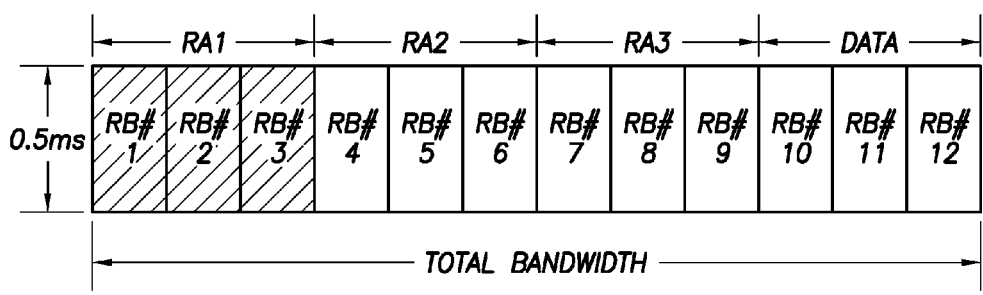
FIG.10
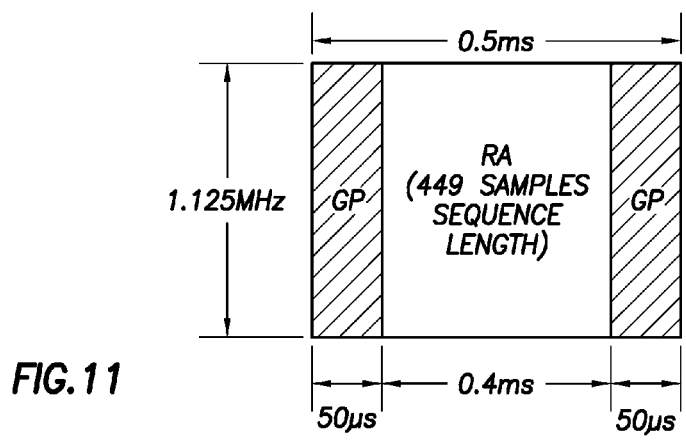
FIG.11

SYSTEM AND METHOD FOR RANDOM ACCESS IN A WIRELESS COMMUNICATION SYSTEM

CLAIM OF PRIORITY

This application claims priority from U.S. Provisional Patent Application Ser. No. 60/840,202, filed on Aug. 25, 2006, and entitled "RANDOM ACCESS IN AN OFDM WIRELESS COMMUNICATION SYSTEM", which is hereby incorporated by reference in its entirety.

BACKGROUND

Wireless communication systems generally use multiple frequencies to provide greater bandwidth than would be possible using a single frequency. Such systems, particularly large-scale systems such as those used for telecommunications, are typically divided into cells that provide wireless coverage to a particular area, although some overlap may exist between cells. In some systems, cells may be further divided into sectors.

The use of multiple frequencies may cause interference between cells or between sectors. For example, random access transmissions in neighboring cells generally use the same frequency subbands. This may result in increased interference from the neighboring cells, thereby degrading random access performance. Moreover, the number of sequences used for random access planning in the neighboring cells is limited, which may result in two neighboring cells using the same sequence. This may increase the probability of false alarms where a response to a random access request is transmitted by an incorrect cell, which results in degraded system performance. Improved methods are needed to minimize inter-cell and/or intra-cell interference.

SUMMARY

In one embodiment, a method comprises allocating first and second random access frequency subbands from a plurality of random access orthogonal subbands to first and second subdivisions, respectively, in a wireless communication network. The first random access frequency subband is assigned to a first position in a first subframe for use in the first subdivision during a first transmission slot, and the second random access frequency subband is assigned to a second position in the first subframe for use in the second subdivision during the first transmission slot. The first random access frequency subband is assigned to a third position in a second subframe for use in the first subdivision during a second transmission slot following the first transmission slot, and the second random access frequency subband is assigned to a fourth position in the second subframe for use in the second subdivision during the second transmission slot.

In another embodiment, a method comprises identifying a total number of available random access sequences for use in a portion of a wireless network and identifying an amount of information to be transferred from a mobile station to a base station in the portion of the wireless network via the random access sequences. A plurality of random access sequence groups based on the total number of available random access sequences and the amount of information to be transferred are defined, and first and second random access sequence groups of the plurality of random access sequence groups are assigned to first and second subdivisions of the wireless network for random access requests in the first and second subdivisions.

In yet another embodiment, a method comprises waiting for a random access request on a designated random access subband during a first transmission period, wherein the designated random access subband is located at a first position in a designated subframe used during the first transmission period. The method also includes waiting for a random access request on the designated random access subband during a second transmission period, wherein the designated random access subband is located at a second position in the designated subframe used during the second transmission period. The method further includes responding to a random access request during the first and second transmission periods only if the random access request is transmitted on the designated random access subband.

In still another embodiment, a method comprises waiting for a random access request associated with a designated random access sequence group during a first transmission period, wherein the designated random access sequence group is located at a first position in a designated subframe of the first transmission period. The method also includes waiting for a random access request on the designated random access subband during a second transmission period, wherein the designated random access subband is located at a second position in the designated subframe of the second transmission period. The method further includes responding to a random access request during the first and second transmission periods only if the random access request is transmitted on the designated random access subband.

In another embodiment, a method comprises identifying a random access frequency subband for use in submitting a random access request in a subdivision of a wireless network, transmitting a random access request using the random access frequency subband in a first designated position of a designated subframe during a first transmission period, and waiting for a response to the random access request.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 3A is a diagram of one embodiment of a wireless transmitter with which the present invention may be used.

FIG. 3B is a diagram of one embodiment of a wireless receiver with which the present invention may be used.

FIG. 9 is a diagram of a sectorized cell illustrating of one embodiment of the allocation of orthogonal random access resources.

FIG. 10 is a diagram illustrating one embodiment of random access resource allocation within a subframe.

FIG. 11 is another diagram illustrating one embodiment of random access resource allocation within a subframe.

DETAILED DESCRIPTION

Figure 1:
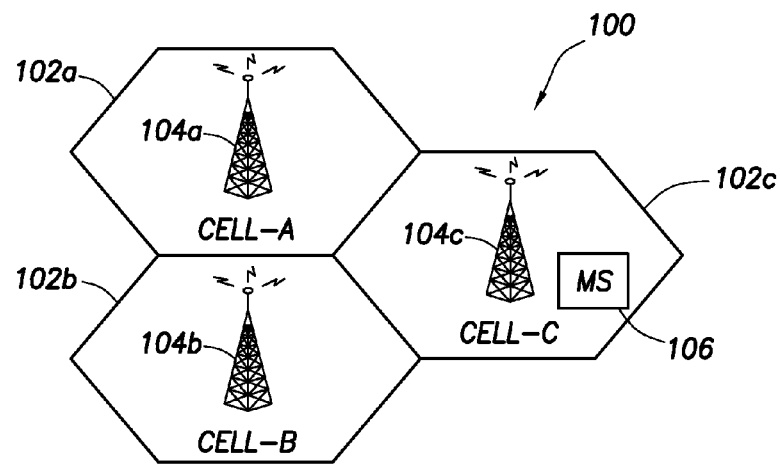
FIG. 1 is a diagram of one embodiment of a wireless network within which embodiments of the present invention may be implemented.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, one embodiment of a portion of a wireless network 100 is illustrated with cells 102a (Cell-A), 102b (Cell-B), and 102c (Cell-C), and corresponding access points (e.g., base stations) 104a, 104b, and 104c. Although not shown, it is understood that base stations 104a, 104b, and 104c may include processors, memories, and other components that enable the base stations to receive, store, retrieve, process, and transmit instructions and data over wireless and/or wireline communication links. Furthermore, at least some functionality of a base station may be distributed and located elsewhere, either within a cell or outside of a cell. In the present example, the network 100 uses Orthogonal Frequency Division Multiplexing (OFDM) that may be combined with time, frequency, or coding separation to provide access to multiple users.

In a wireless communication system such as the wireless network 100, a given geographic area is provided with radio coverage via multiple base stations (e.g., the base stations 104a, 104b, and 104c) distributed throughout the geographic area. Each base station 104a, 104b, and 104c can serve traffic in the smaller geographic area that is covered by that particular base station. Accordingly, multiple base stations in the wireless network 100 can simultaneously serve users in different geographic areas, thereby increasing the overall capacity of the network. For purposes of example, a mobile station 106 is located in cell 102c and serviced by base station 104c. The mobile station (MS) 106 may be any device capable of wirelessly communicating with the base station 104c, including computers, cell phones, personal digital assistants (PDAs), pagers, and portable game devices. It is understood that the device need not be mobile, but may be stationary user equipment (UE).

Figures 2A, 2B, 2C:
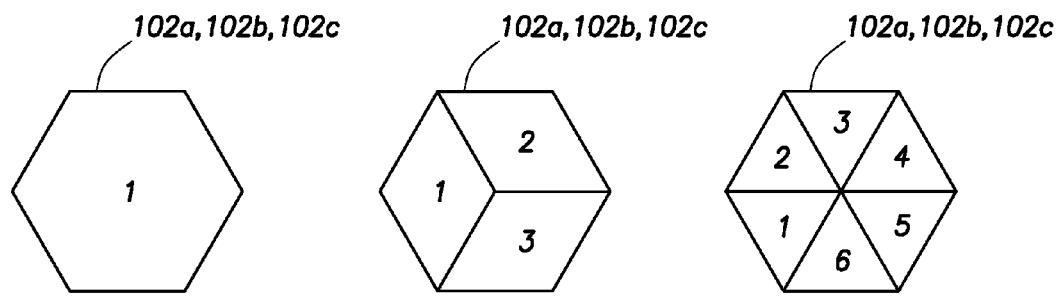
FIGS. 2A-2C illustrate different embodiments of a sectorized cell within the wireless network of FIG. 1.

With additional reference to FIGS. 2A-2C, one or more of the cells 102a, 102b, and 102c may be sectorized in order to further increase the capacity of the wireless network 100. For example, one or more of the base stations 104a, 104b, and 104c may be an omni-sector base station (FIG. 2A), or may support multiple sectors in a cell as a 3-sector base station (FIG. 2B) or a 6-sector base station (FIG. 2C). In case of multiple sectors per base station, each of the sectors may handle part of the traffic in a geographic area that is smaller than the cell containing the sector, thereby boosting the total capacity of the wireless network 100. It is understood that the cells 102a, 102b, and/or 102c may not contain an identical number of sectors.

Referring to FIGS. 3A and 3B, one embodiment of an OFDM based wireless communication system is provided. FIG. 3A illustrates a transmitter 300 for the OFDM based wireless communication system, while FIG. 3B illustrates a receiver 312 for the system. The transmitter 300 may be an access point (e.g., a base station) in a wireless network such as the wireless network 100 of FIG. 1, and such networks may include wideband digital communication systems such as wireless local area networks (LANs) (e.g., IEEE 802.11a and 802.11g networks), digital audio broadcasting systems (e.g., HD Radio, T-DMB and ISDB-TSB), terrestrial digital television systems (e.g., DVB-T, DVB-H, T-DMB and ISDB-T), WiMax wireless metropolitan area networks (MANs) (e.g., IEEE 802.16 networks), Mobile Broadband Wireless Access (MBWA) networks (e.g., IEEE 802.20 networks), Ultra Mobile Broadband (UMB) systems, Flash-OFDM cellular systems, and Ultra wideband (UWB) systems. It is understood that OFDM is used as an example and that the present disclosure may be used with other wireless systems. For example, the present disclosure may be used with Global System for Mobile communications (GSM) and/or code division multiple access (CDMA) communications systems. The receiver 312 may be any wireless OFDM receiver and may be included in such fixed or mobile terminals as computers, cell phones, personal digital assistants (PDAs), pagers, portable game devices, and any other device capable of wireless communications.

With specific reference to the transmitter 300 of FIG. 3A, data to be transmitted is converted into modulated symbols via a Quadrature Amplitude Modulation (QAM) process in QAM modulation block 302. The modulated symbols are serial-to-parallel (S/P) converted in S/P block 304 and input to an inverse Fast Fourier Transform (IFFT) block 306. The IFFT block 306 outputs N time-domain samples, where N refers to the IFFT/FFT size used by the OFDM system. After processing by the IFFT block 306, the signal is parallel-to-serial (P/S) converted by P/S block 308 and a cyclic prefix (CP) is added to the signal sequence by CP addition block 310. The resulting sequence of samples is referred to as OFDM symbol and may be transmitted after up-conversion to RF.

With specific reference to the receiver 312 of FIG. 3B, after down-conversion from RF, the cyclic prefix is first removed from a received OFDM symbol by CP removal block 314 and the signal is serial-to-parallel converted by S/P block 316. The signal is then fed into FFT block 318, and the output of the FFT block 318 is parallel-to-serial converted in P/S block 320. The resulting QAM modulation symbols are input to QAM demodulation block 322, which demodulates the symbols to recover the transmitted data.

The total bandwidth in an OFDM system, such as that of FIGS. 3A and 3B, is divided into narrowband frequency units called subcarriers. The number of subcarriers is equal to the FFT/IFFT size N used in the system. Generally, the number of subcarriers used for data is less than N because some subcarriers at the edge of the frequency spectrum are reserved as guard subcarriers, and usually no information is transmitted on guard subcarriers.

Figure 4:
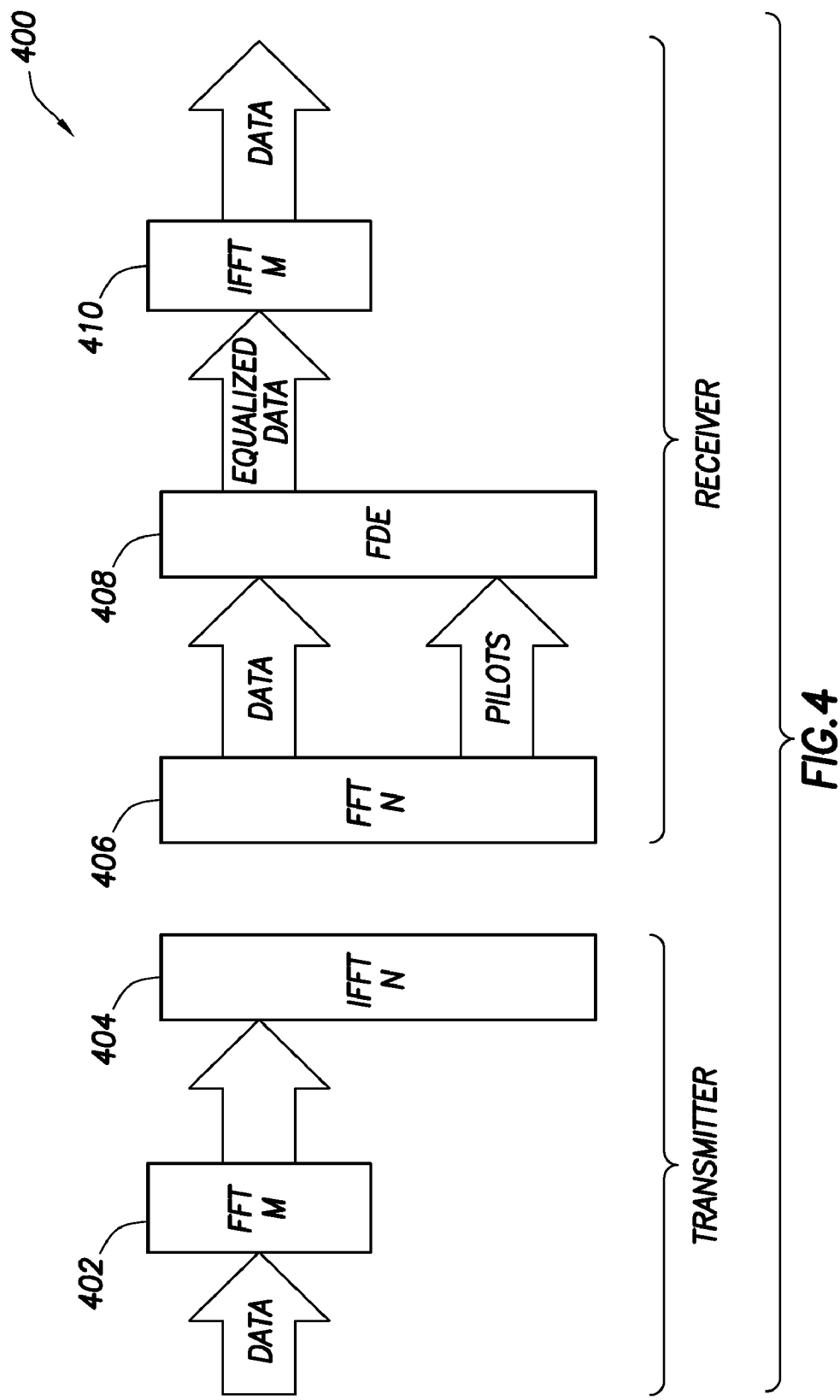
FIG. 4 is a diagram of another embodiment of a wireless system with which the present invention may be used.

With additional reference to FIG. 4, one embodiment of a discrete Fourier transform spread (DFT-spread) OFDM system 400 is illustrated. Generally, an advanced wireless system may employ OFDMA or DFT-spread OFDMA. A DFT-spread OFDM system may be attractive for use in the uplink (i.e., the link from a mobile station to a base station) in a wireless system due to its low peak-to-average power (PAPR) characteristic. This low PAPR is due to the relatively limited transmit power available in a mobile station. A low PAPR enables a lower power amplifier back off and allows a mobile station to transmit at a higher power and higher data rate, thereby improving the coverage and spectral efficiency of a wireless system.

Within the DFT-spread OFDM system 400, coded modulation symbols are FFT-pre-coded in FFT block 402 before mapping to the input of IFFT block 404 in a transmitter. At a receiver, FFT block 406 handles the received signal, which is then passed to frequency-domain equalization (FDE) block 408, where FDE is performed. An IFFT operation is then performed in IFFT block 410 on the equalized symbols to obtain the data modulation symbols.

Figure 5:
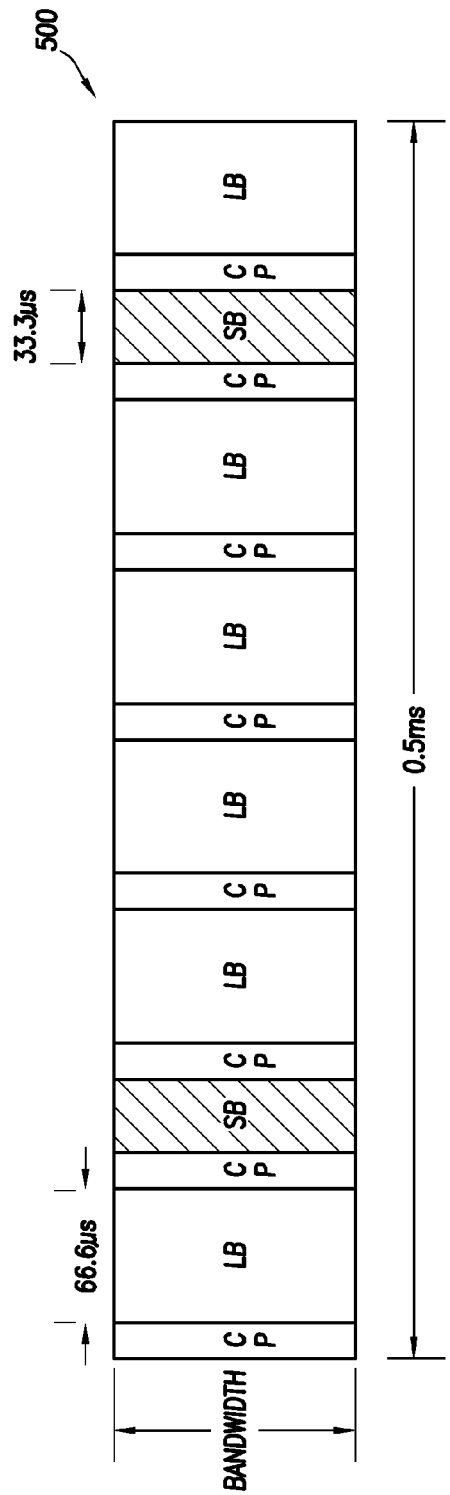
FIG. 5 is an illustration of one embodiment of an uplink subframe structure.

Referring to FIG. 5, one embodiment of the structure of an uplink subframe 500 is shown that may be used, for example, with the system 400 of FIG. 4. The uplink subframe 500 is used for transmission of control and data on the mobile station to the base station link (i.e., the uplink). In the present example, a subframe of duration 0.5 milliseconds (ms) is divided into six long blocks (LB), each of duration 66.6 microseconds (μs), and two short blocks (SB), each of duration 33.3 μs. A cyclic prefix is added to both the long blocks and short blocks. The short blocks are used to carry the pilot signal for channel estimation while the long blocks carry the data symbols.

Figure 6:
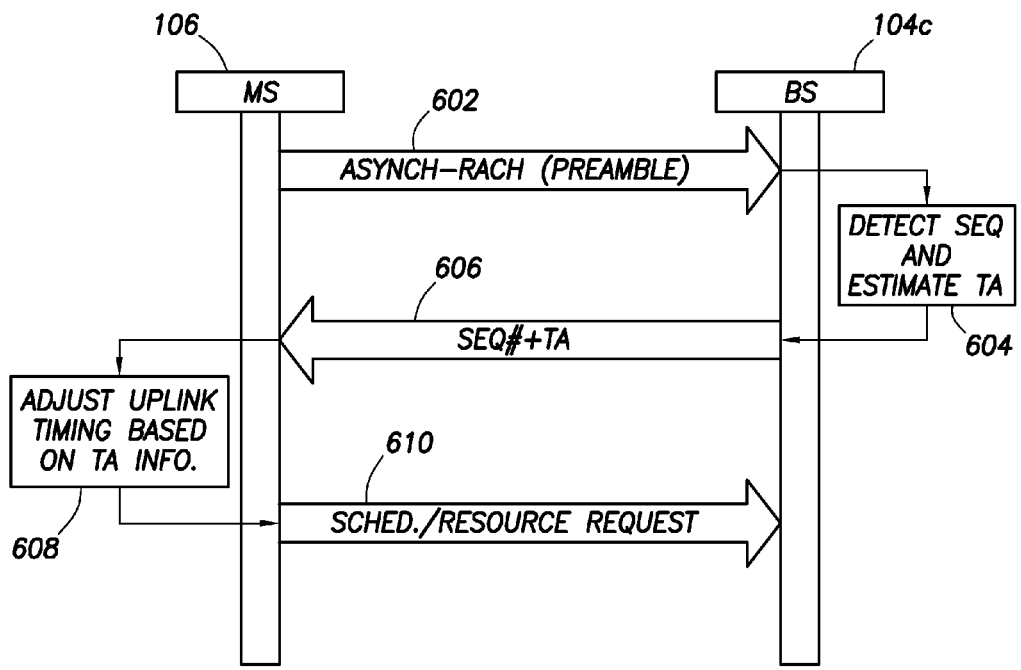
FIG. 6 is a sequence diagram illustrating one embodiment of a random access procedure.

Referring to FIG. 6, one embodiment of a random access procedure that may be used within the network 100 of FIG. 1 is illustrated. A random access procedure may be used when a mobile station (e.g., the mobile station 106 of FIG. 1) or user equipment powers up and needs to access the wireless network 100. Random access procedures can generally be classified in one of two categories: non-synchronized random access and synchronized random access.

Non-synchronized access may be used when the mobile station 106 is not uplink time-synchronized with the base station 104c. This may happen when the mobile station 106 returns from sleep mode or when it loses uplink timing synchronization. When this happens, the mobile station 106 sends an asynchronous reverse access channel (async-RACH) preamble to the base station 104c in step 602. Non-synchronized access allows the base station 104c to estimate and, if needed, adjust the mobile station 106 transmission timing to within a fraction of the cyclic prefix. When the base station 104c receives a random access sequence successfully, it detects the sequence number and estimates timing advance (TA) information in step 604. In step 606, the base station 104c sends information on the successful sequence along with the TA information to the mobile station 106. The mobile station 106 can then determine if its random access attempt has been successful by matching the sequence number it used for asynchronous random access with the sequence number information received from the base station 104c. If the sequence number matches, the mobile station 106 assumes that its random access attempt has been successful and uses the TA information received along with the sequence ID to adjust its uplink timing in step 608. After the mobile station 106 has acquired uplink timing synchronization, it can send uplink scheduling or resource requests to the base station 104c in step 610.

In general, to meet coverage requirements using non-synchronized random access, only the preamble is transmitted. The preamble is selected from a predefined set of sequences. Preamble waveforms are generally selected to have good detection probability while maintaining a low false alarm rate, a low collision probability, a low peak-to-average power ratio (PAPR), and to allow for accurate timing estimations. Some examples of sequences that meet these requirements are Zadoff-Chu and Generalized Chirp-Like sequences. These sequences have advantages relative to pseudo random (PN) sequences due to their low PAPR properties that are important for uplink transmissions in a wireless system due to the relatively limited transmit power of mobile stations.

The Zadoff-Chu sequence of length N is defined as $$g_p(n) = \begin{cases} e^{-j\frac{2\pi}{M}\frac{1}{2}pn^2} & \text{when } N \text{ is even} \\ e^{-j\frac{2\pi}{M}\frac{1}{2}pn(n+1)} & \text{when } N \text{ is odd} \end{cases}, n = 0, 1, \ldots, N-1$$

where p, the sequence index, is relatively prime to N (i.e., the only common divisor for p and N is 1). For a fixed p, the Zadoff-Chu sequence has an ideal periodic auto-correlation property (i.e., the periodic auto-correlation is zero for all time shifts other than zero). For different p values, Zadoff-Chu sequences are not orthogonal, but exhibit low cross correlation. If the sequence length N is selected as a prime number, there are N−1 different sequences with periodic cross-correlation of $1/\sqrt{N}$ between any two sequences regardless of time shift. In summary, with the Zadoff-Chu sequence, N−1 different sequences with fixed periodic cross-correlation are available to be used as preambles, provided that N is a prime number. In addition, each of the sequences has ideal periodic auto-correlation properties.

The Generalized Chirp-Like (GCL) sequence of length N is defined as:

$$c(n) = g_p(n)b(n \bmod m), n=0,1,\ldots,N-1$$

with the sequence length N satisfying the relationship $N=sm^2$ where s and m are positive integers. The carrier sequence $g_p(n)$ is the Zadoff-Chu sequence of length N. The sequence index p must be a relative prime to N. To provide a set of orthogonal GCL sequences, a common Zadoff-Chu sequence is modulated by m different sequences $\{b_i(k)\}$, i=0, ..., m−1. The Zadoff-Chu sequence is one example of a GCL sequence where the modulating sequence is comprised of all ones. In summary, with the GCL sequence, wm different sequences are available to be used as preambles, where w is the number of available Zadoff-Chu sequences of length N. In addition, for each of the w Zadoff-Chu carrier sequences, there are m different GCL sequences with a zero correlation zone of length sm−1.

Figure 7:
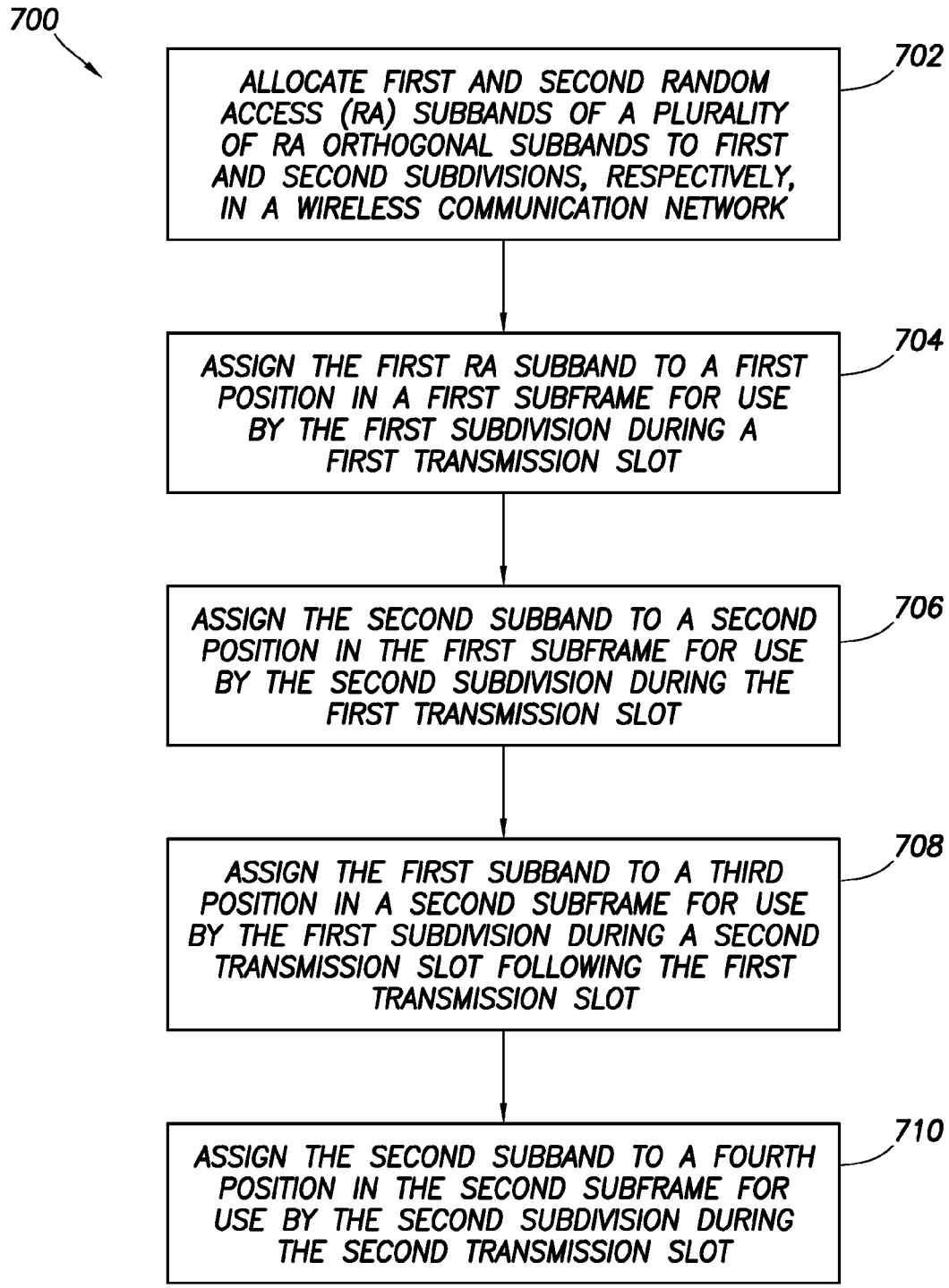
FIG. 7 is a flowchart illustrating one embodiment of a method for random access in a wireless network.

Referring to FIG. 7, in one embodiment, a method 700 illustrates the allocation of orthogonal frequency resources for a random access channel to neighboring subdivisions (e.g., cells and/or sectors) in a wireless network (e.g., the wireless network 100 of FIG. 1) in such a way that interference between the neighboring subdivisions is minimized. More specific examples of the method 100 will be described below in greater detail. In the present example, the random access subframes occur every $n^{th}$ subframe. Although not described with respect to FIG. 7, it is understood that all or part of a sequence (e.g., a Zadoff-Chu or a Generalized Chirp-Like sequence) may be transmitted using a random access subframe.

In step 702, a first random access subband selected from a group of multiple available random access orthogonal subbands is allocated to a first subdivision in the wireless network 100, and a second random access subband selected from the group is assigned to a second subdivision in the wireless network 100. In step 704, the first subband is assigned to a first position in a first subframe for use by the first subdivision during a first transmission slot (e.g., a time or frequency slot) and, in step 706, the second subband is assigned to a second position in the first subframe for use by the second subdivision during the first transmission slot.

In step 708, the first subband is assigned to a third position (which may be the same as the second position) in a second subframe for use during a second transmission slot following the first transmission slot. In step 710, the second subband is assigned to a fourth position (which may be the same as the first position) in the second subframe for use during the second transmission slot. In this manner, each subdivision is assigned a random access subband and the random access subband's position in a subframe may vary based on a scheme that may, for example, be known by the mobile station 106 and the base station 104c controlling the subdivision. Sequences, such as Zadoff-Chu or Generalized Chirp-Like sequences, may be used in conjunction with the RA subbands to provide further differentiation between the first and second subdivisions.

Figure 8A:
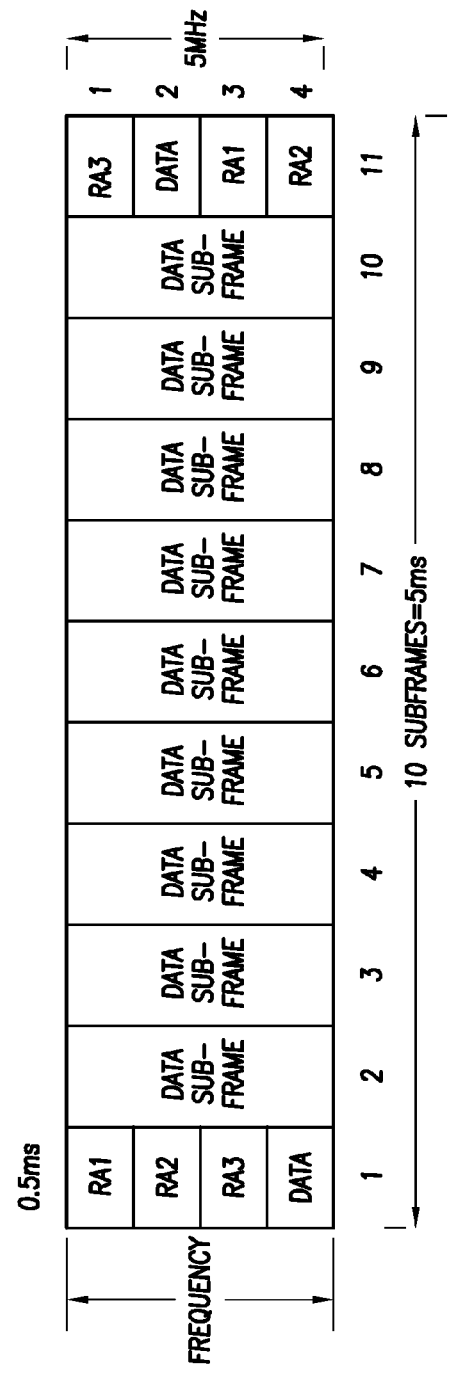
FIG. 8A is an illustration of one embodiment of an uplink frame structure containing random access information.
Figure 8B:
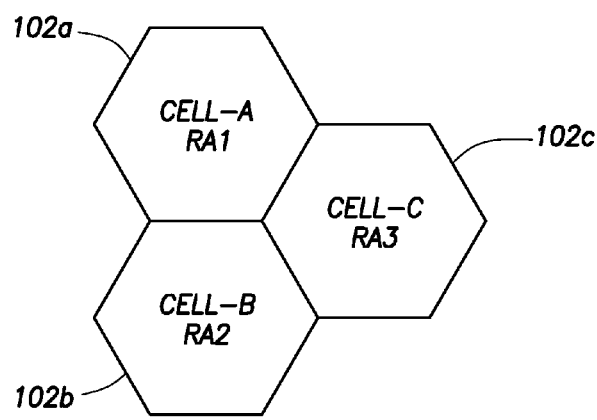
FIG. 8B is a diagram of one embodiment of a wireless network illustrating the allocation of random access resources to support the random access information contained within the uplink frame structure of FIG. 8A.

Referring to FIGS. 8A and 8B, in another embodiment, the organization of RA subbands in a subframe may enable neighboring cells in a wireless network (e.g., the wireless network 100 of FIG. 1) to be allocated orthogonal frequency resources for the random access (RA) channel in such a way that interference between the neighboring cells is minimized.

In the example of FIG. 8A, eleven subframes are illustrated, with each subframe being 0.5 ms and covering a 5 MHz frequency range. The random access subframes occur every $n^{th}$ subframe (e.g., at subframes 1 and 11). The remaining subframes may carry data.

In the present example, the total frequency resource (i.e., 5 MHz) within a random access subframe (e.g., subframe 1) is divided into multiple random access subbands and optional data subbands. Accordingly, every tenth subframe contains three RA subbands, RA1, RA2 and RA3 and one data subband. In the neighboring cells (FIG. 8B), orthogonal random access subbands are allocated. For example, RA1 is used in Cell-A, RA2 in Cell-B and RA3 in Cell-C. This approach avoids random access interference between the three neighboring cells and also reduces the probability of random access false alarms that may occur when a base station decodes and sends a response to random access requests that are intended for the neighboring cells.

As illustrated, the random access subbands may be hopped from one RA subframe to the next subframe in order to provide frequency diversity. For example, if a user performs a random access using RA1 in subband 1 in subframe 1 and the random access fails, the retransmission of random access occurs in subband 3 because RA1 has hopped to subband 3 in subframe 11. The random access frequency hopping sequence is assumed to be known at both the mobile station 106 and the base station 104c. This information, for example, may be broadcast on the broadcast control channel (BCH) from the base station 104c.

Referring to FIG. 9, in yet another embodiment, orthogonal random access subbands may be allocated between different sectors of a cell (i.e., distinct geographic areas controlled by the same base station). In the present example, the RA1, RA2 and RA3 random access subbands described with respect to FIG. 8A are allocated to sector-A, sector-B and sector-C, respectively, rather than to separate cells. Each sector (i.e., the portion of the base station allocated to a particular sector) listens for random access requests in the random access frequency subband allocated to it. This prevents sectors from decoding random access requests intended for the neighboring sectors.

In the present example, the mobile station 106 (FIG. 1) is connected to sector-A and is located at the boundary of sector-A and sector-C. The mobile station 106 performs a random access procedure using the RA1 random access subband. Sector-A will attempt to decode the random access request from the mobile station 106 because RA1 is allocated to sector-A. The neighboring sector-C, which has been allocated RA3, will not attempt to decode any random access requests on RA1. Accordingly, this approach aids in reducing the probability of false random access occurrences.

Referring to FIG. 10, one embodiment of random access resource allocation within a subframe (e.g., subframe 1 of FIG. 8A) is illustrated from a bandwidth perspective. In the present example, the total system bandwidth for a subframe (e.g., 5 MHz) may be divided into resource blocks that are each 375 KHz wide. A resource block, for example, may include twenty-five OFDM subcarriers at a 15 KHz subcarrier spacing. The random access bandwidth may be defined to occupy three resource blocks with a total bandwidth of 1.125 MHz. This provides room for three random access subbands using a total of nine resource blocks with the remaining three resource blocks of the subframe used for data, as illustrated in FIG. 8A.

With additional reference to FIG. 11, one embodiment of random access resource allocation within a subframe (e.g., subframe 1 of FIG. 8A) is illustrated from a time perspective. A subframe of duration 0.5 ms is divided into a 0.4 ms random access sequence transmission time period and a 0.1 ms period covering guard and cyclic prefix duration. The guard period is used to accommodate propagation delays when the mobile station is not synchronized on the uplink. Assuming a sampling rate of 1.125 MHz, approximately four hundred and fifty samples fit into the 0.4 ms sequence transmission time period. Assuming that Zadoff-Chu sequences are used for random access, the sequence length is a prime number that is 449. This allows for a total of 449 sequences with low cross-correlation properties to be used for random access purposes.

Figure 12:
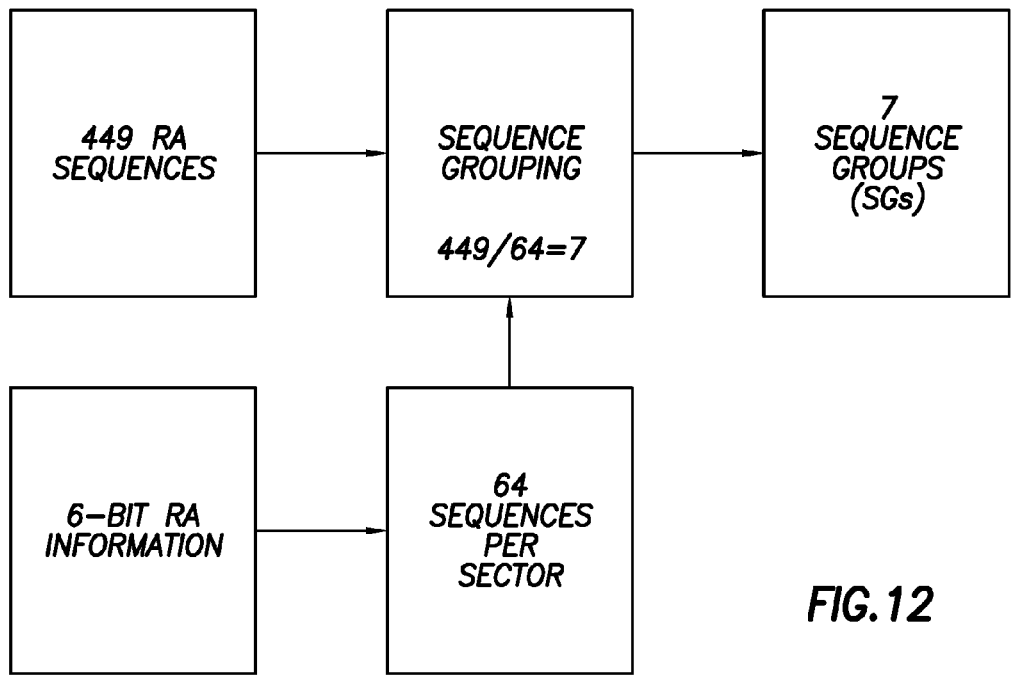
FIG. 12 is a diagram illustrating one embodiment of the creation of random access sequence groups.

With additional reference to FIG. 12, the total number of random sequences may be divided into sequence groups. The random access information is 6-bit information, and may include a random access cause, mobile station buffer status, and downlink channel quality information. The random access cause indicates the reason for random access. The buffer status gives a rough estimate to the base station about the amount of data that the mobile stations needs to transmit. The downlink channel quality allows the base station to use an appropriate power level for the signaling message that is sent to acknowledge the random access request. In order to provide for 6-bit information, sixty-four ($2^6$=64) sequences per sector are needed. This allows for the division of the total of 449 sequences into seven sequence groups (SGs) (i.e., 449/64=7).

Figure 13:
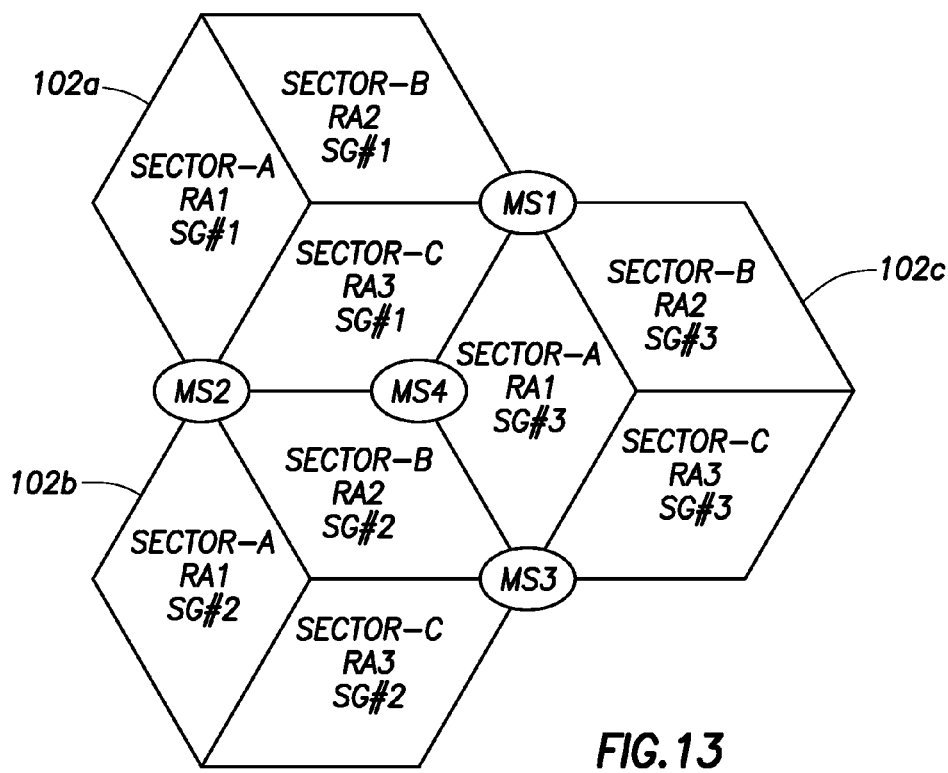
FIG. 13 is a diagram illustrating one embodiment of random access resource allocation within the wireless network of FIG. 1 using a different random access sequence group for each cell and orthogonal random access subbands for sectors within each cell.

Referring to FIG. 13, in yet another embodiment, a combination of sequence groups (e.g., the sequence groups calculated with respect to FIG. 12) and random access subbands may be used for random access planning and to provide orthogonality between neighboring cells in a wireless network such as the wireless network 100 of FIG. 1. In the present example, the cells 102*a*, 102*b*, and 102*c* are sectorized, and the sectors of the same base station use orthogonal random access subbands with sector-A using RA1, sector-B using RA2, and sector-C using RA3. The neighboring base stations use different random access sequence groups (SGs). For example, base station 104*a* may use SG#1, base station 104*b* may use SG#2, and base station 104*c* may use SG#3.

It is noted that in the overlapping region shown with the locations of mobile stations MS1, MS2 and MS3, two overlapping sectors may use the same random access subband. However, orthogonality is provided by using different sequence groups. For example, MS1 is adjacent to both sector-B in cell 102*a* and sector-B in cell 102*c*, both of which use RA2. However, base station 104*a* only decodes SG#1 and base station 104*c* only decodes SG#3. Therefore, if MS1 sends a random access request, it will be decoded in a single sector to which the mobile station is assigned. Similarly, MS2 is adjacent to sectors using RA1 and MS3 is adjacent to sectors using RA3, but the different sequence groups used by the adjacent sectors enable differentiation between the sectors.

The use of different RA subbands provides perfect orthogonality in frequency. However, different sequence groups in some cases may not be completely orthogonal due to non-zero cross-correlation of the sequences used. In such cases, it may be preferable to use orthogonal RA subbands among the immediate interfering sectors. For example, MS4 is located in the overlapping region between three sectors from three different base stations (i.e., sector-C of cell 102*a*, sector-B of cell 102*b*, and sector-A of cell 102*c*). Since the three sectors use orthogonal RA subbands, the random access transmissions in one sector do not interfere with transmission in the other sectors.

Figure 14:
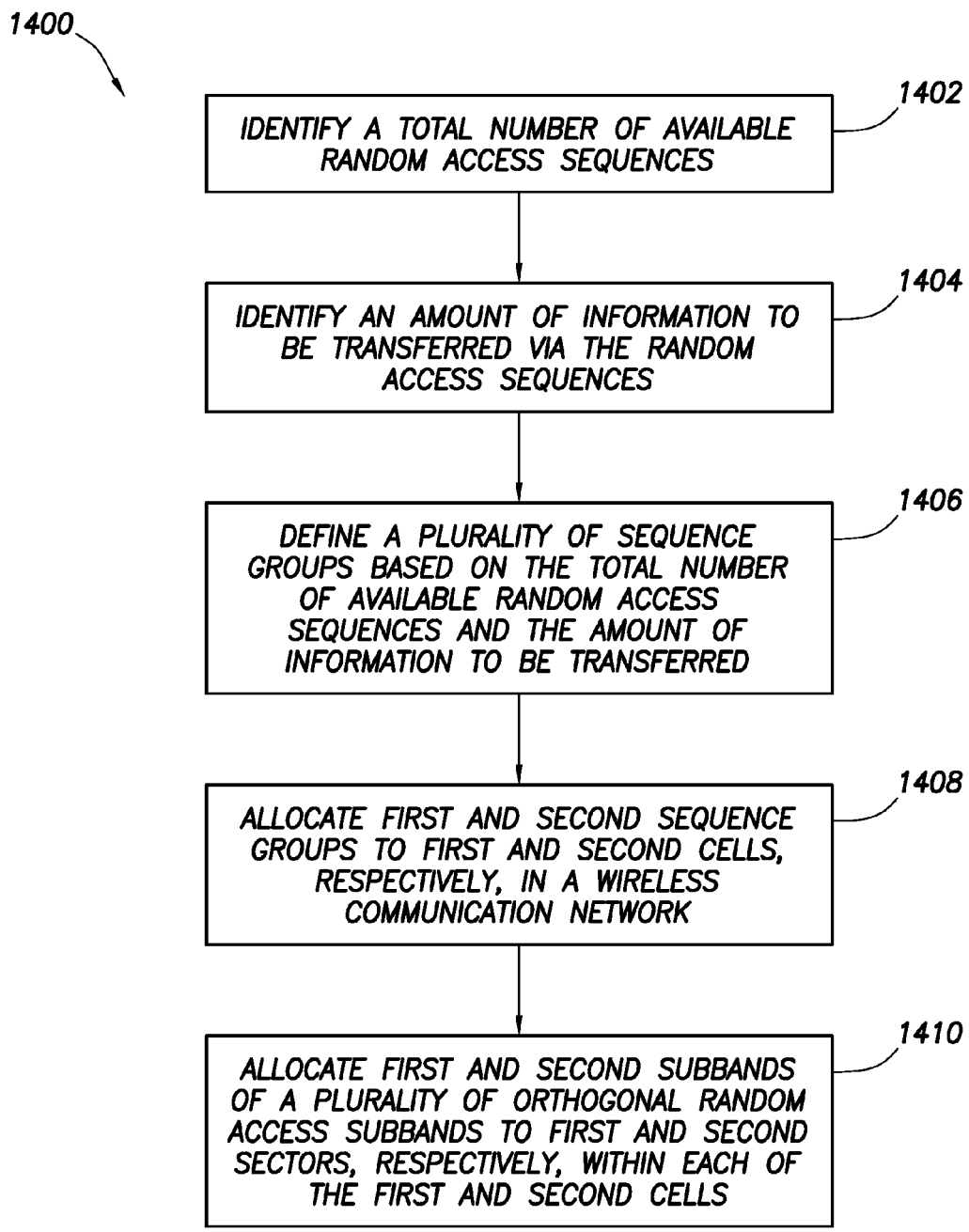
FIG. 14 is a flowchart illustrating one embodiment of a method for implementing the random access allocation of FIG. 13.

With additional reference to FIG. 14, a method 1400 illustrates one embodiment of a process by which the network organization of FIG. 13 may be accomplished. In step 1402, a total number of available random access sequences is identified. For purposes of example, the 449 sequences identified with respect to FIG. 11 are used. Accordingly, step 1402 identifies a total of 449 available random access sequences. In step 1404, an amount of information to be transferred via the random access sequences is identified. Again using a previous illustration (FIG. 12) for purposes of example, the random access information is 6-bit information and so sixty-four ($2^6$=64) sequences per sector are needed. In step 1406, a plurality of sequence groups may be defined based on the total number of available random access sequences (449) and the number of sequences needed per sector (64), which denotes the amount of information to be transferred. Accordingly, in step 1406, a total of 449/64=7 sequence groups may be defined.

In step 1408, a sequence group may be assigned to a cell, with the seven different sequence groups being assigned to seven different cells if needed. In step 1410, random access subbands may be allocated to sectors within each cell as previously described. Although not shown, it is understood that the random access subbands may occupy different positions in different subframes as previously described.

Figure 15:
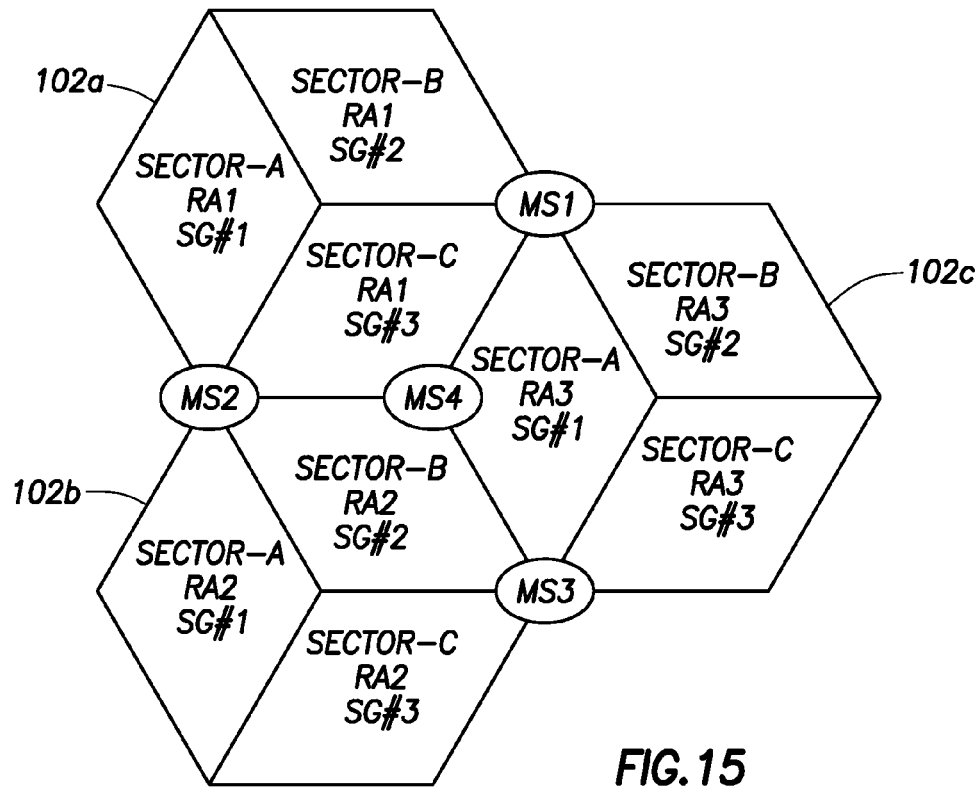
FIG. 15 is a diagram illustrating one embodiment of random access resource allocation within the wireless network of FIG. 1 using a random access subband for each cell and different sequence groups for sectors within each cell.

Referring to FIG. 15, in still another embodiment, a combination of sequence groups and random access subbands may be used for random access planning and to provide orthogonality between the neighboring cells. In the present example, the cells 102*a*, 102*b*, and 102*c* are sectorized, and the sectors of the same base station use different sequence groups. For example, sector-A may use SG#1, sector-B may use SG#2, and sector-C may use SG#3. However, the neighboring base stations use orthogonal random access subbands with base station 104*a* using RA1, base station 104*b* using RA2, and base station 104*c* using RA3.

It is noted that in the overlapping region shown with the locations of mobile stations MS1, MS2, and MS3, two overlapping sectors may use the same sequence group. However, orthogonality is provided by using different random access subbands for each cell. For example, MS1 is adjacent to both sector-B in cell 102*a* and sector-B in cell 102*c*, each of which used sequence group 2. However, base station 104*a* only decodes RA1 and base station 104*c* only decodes RA3. Therefore, if MS1 sends a random access request, it will be decoded in a single sector to which the mobile station is assigned. Similarly, MS2 is adjacent to sectors using SG#1 and MS3 is adjacent to sectors using SG#3, but the different random access subbands used by the corresponding base stations enable differentiation between adjacent sectors.

It is noted that the use of different RA subbands may be desirable in immediate interfering sectors to provide perfect orthogonality in frequency as the sequence groups may not have perfect orthogonality. For example, MS4 is located in the overlapping region between three sectors from three different base stations (i.e., sector-C of cell 102*a*, sector-B of cell 102*b*, and sector-A of cell 102*c*). Since the three sectors use orthogonal RA subbands, the random access transmissions in one sector do not interfere with transmission in the other sectors even if the sequence groups are not perfectly orthogonal.

Figure 16:
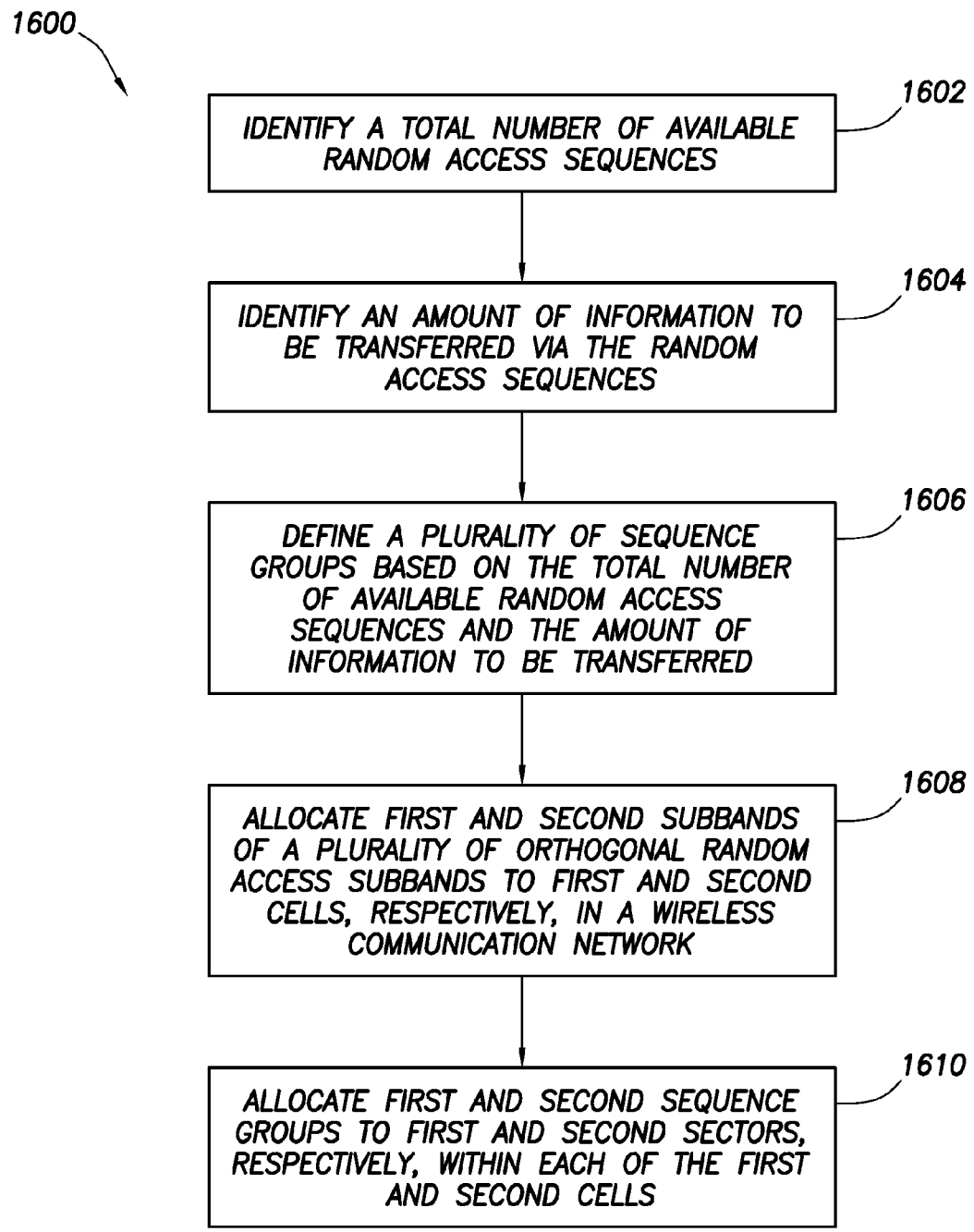
FIG. 16 is a flowchart illustrating one embodiment of a method for implementing the random access allocation of FIG. 15.

With additional reference to FIG. 16, a method 1600 illustrates one embodiment of a process by which the network organization of FIG. 15 may be accomplished. In step 1602, a total number of available random access sequences is identified. For purposes of example, the 449 sequences identified with respect to FIG. 11 are used. Accordingly, step 1602 identifies a total of 449 available random access sequences. In step 1604, an amount of information to be transferred via the random access sequences is identified. Again using a previous illustration (FIG. 12) for purposes of example, the random access information is 6-bit information and so sixty-four ($2^6$=64) sequences per sector are needed. In step 1606, a plurality of sequence groups may be defined based on the total number of available random access sequences (449) and the number of sequences needed per sector (64), which denotes the amount of information to be transferred. Accordingly, in step 1606, a total of 449/64=7 sequence groups may be defined. In step 1608, a random access subband may be allocated to a cell, with different random access subbands being assigned to different cells. In step 1610, different sequence groups may be allocated to the sectors within each cell.

Figure 17:
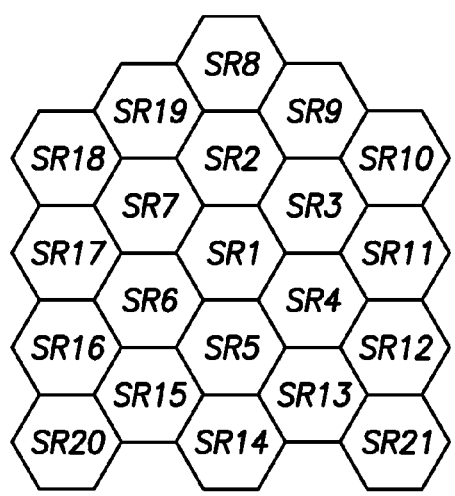
FIG. 17 is a diagram illustrating one embodiment of random access resource allocation within a wireless network using pairs of random access subbands and sequence groups.

Referring to FIG. 17, in yet another embodiment, a total number of sequence group and RA subband pairs (referred to herein as "SRs") may be obtained by multiplying the number of sequence groups with the number of RA subbands. Different SRs are then used in the neighboring cells for asynchronous random access request transmissions. In the present example, a total of twenty-one SRs may be obtained from the seven SGs and three RA subbands described above. The twenty-one SRs are then allocated to cells within a coverage area. It is noted that combining RA subbands and sequence groups expands the total number of available orthogonal random access channels for easy planning and improved random access performance due to reduced interference. Accordingly, the present example may provide an asynchronous random access transmission scheme where neighboring cells use a combination of frequency subbands and random access sequence groups to provide a large number of random access channels.

Although only a few exemplary embodiments of this disclosure have been described in details above, those skilled in the art will readily appreciate that many modifications are possible in the exemplary embodiments without materially departing from the novel teachings and advantages of this disclosure. Also, features illustrated and discussed above with respect to some embodiments can be combined with features illustrated and discussed above with respect to other embodiments. For example, various steps from different flow charts may be combined, performed in an order different from the order shown, or further separated into additional steps. Furthermore, steps may be performed by network elements other than those disclosed. Accordingly, all such modifications are intended to be included within the scope of this disclosure.

What is claimed is:

1. A method comprising:
    defining a plurality of unique subband-sequence pairs by associating each of a plurality of random access orthogonal subbands with each of a plurality of random access sequence groups, each random access orthogonal subband comprising a plurality of subcarriers;
    allocating first and second subband-sequence pairs from the plurality of unique subband-sequence pairs to first and second subdivisions, respectively, in a wireless communication network;
    assigning the first subband-sequence pair to a first position in a first subframe for use in the first subdivision during a first transmission slot;
    assigning the second subband-sequence pair to a second position in the first subframe for use in the second subdivision during the first transmission slot; and
    frequency hopping the first and second unique subband-sequence pairs in a second subframe during a second transmission slot.

2. The method of claim 1 wherein the first and second subdivisions are cells, and wherein the method further comprises selecting the first and second subdivisions from a plurality of cells in the wireless communication network.

3. The method of claim 1 wherein the first and second subdivisions are sectors within a cell, and wherein the method further comprises selecting the first and second subdivisions from a plurality of sectors within the cell.

4. The method of claim 1 further comprising:
    identifying a total number of available random access sequences;
    identifying an amount of information to be transferred from a mobile station to a base station in the wireless network via the random access sequences;
    defining the plurality of sequence groups based on the total number of available random access sequences and the amount of information to be transferred.

5. The method of claim 4 wherein the first and second subdivisions are sectors within a single cell, and wherein the cell is assigned unique subband-sequence pairs that have a common sequence group, and wherein adjacent cells are each assigned other unique subband-sequence pairs that have a different sequence group.

6. The method of claim 4 wherein the first and second subdivisions are cells, and wherein each of the first and second subdivisions is divided into at least first and second sectors, and wherein the first and second sectors within each of the first and second cells are assigned a different sequence group selected from the plurality of sequence groups.

7. The method of claim 4, wherein each random access orthogonal frequency subband further comprises a plurality of resource block, each resource block comprising at least one subcarrier.

8. The method of claim 1 further comprising identifying a predefined sequence of positions within the first and second subframes for each of the first and second subband-sequence pairs.

9. The method of claim 1 wherein frequency hopping the first and second subband-sequence pairs in the second subframe during the second transmission slot comprises:
    assigning the first subband-sequence pair to a third position in a second subframe for use in the first subdivision during a second transmission slot following the first transmission slot; and
    assigning the second subband-sequence pair to a fourth position in the second subframe for use in the second subdivision during the second transmission slot.

10. The method of claim 1 wherein at least one of the first, second, third and fourth positions is sent from a base station to a mobile device.

11. A method comprising:
    determining, by a transmitter in a wireless communications network, a plurality of random access orthogonal subbands;
    determining, by the transmitter, a plurality of random access sequence groups;
    defining, by the transmitter, a plurality of unique subband-sequence pairs by associating each of the plurality of random access orthogonal subbands with each of the plurality of random access sequence groups; and
    assigning, by the transmitter, first and second subband-sequence pairs from the plurality of unique subband-sequence pairs to first and second subdivisions of a wireless network, respectively, for random access requests in the first and second subdivisions.

12. The method of claim 11 wherein the first and second subdivisions are cells.

13. The method of claim 11 wherein the first and second subdivisions are sectors within a cell, the first subband-sequence pair comprises a first subband from the plurality of random access orthogonal subbands, and the second subband-sequence pair comprises a second subband from the plurality of random access orthogonal subbands.

14. The method of claim 11, wherein the first subdivision is a sector within a first cell, the second subdivision is a sector within a second cell, the first subband-sequence pair comprises a first subband from the plurality of random access orthogonal subbands, and the second subband-sequence pair comprises a second subband from the plurality of random access orthogonal subbands.

15. A method comprising:
    defining a plurality of unique subband-sequence pairs by associating each of a plurality of random access orthogonal subbands with each of a plurality of random access sequence groups, each random access orthogonal subband comprising a plurality of subcarriers;
    waiting for a first random access request on a designated random access orthogonal subband during a first transmission period, wherein the designated random access orthogonal subband is located at a first position in a designated subframe used during the first transmission period;

waiting for a second random access request on the designated random access orthogonal subband during a second transmission period, wherein the designated random access orthogonal subband is located at a second position in the designated subframe used during the second transmission period; and responding to the random access requests during the first and second transmission periods only if the random access request is transmitted with random access sequences from a designated random access sequence group that is associated with the designated random access orthogonal subband.

16. The method of claim 15, wherein the designated random access subband is designated for a subdivision from a plurality of random access orthogonal subbands, and the subdivision is one of a cell and a sector within a cell.

17. A method comprising:

defining a plurality of unique subband-sequence pairs by associating each of a plurality of random access orthogonal subbands with each of a plurality of random access sequence groups, each random access orthogonal subband comprising a plurality of subcarriers;

waiting for a random access request associated with a designated random access sequence group during a first transmission period, wherein the designated random access sequence group is located at a first position in a designated subframe of the first transmission period;

waiting for a random access request associated with the designated random access sequence group during a second transmission period, wherein the designated random access sequence group is located at a second position in the designated subframe of the second transmission period; and responding to a random access request during the first and second transmission periods only if the random access request is transmitted on a designated random access subband that is associated with the designated random access sequence group.

18. The method of claim 17, wherein the designated random access subband is designated for a subdivision from a plurality of random access orthogonal subbands, and the subdivision is one of a cell and a sector within a cell.

19. A method comprising:

defining a plurality of unique subband-sequence pairs by associating each of a plurality of random access orthogonal subbands with each of a plurality of random access sequence groups, each random access orthogonal subband comprising a plurality of subcarriers;

identifying a subband-sequence pair from the plurality of unique subband-sequence pairs for use in submitting random access requests in a subdivision of a wireless network;

transmitting a random access request using the identified subband-sequence pair in a first designated position of a designated subframe during a first transmission period; and waiting for a response to the random access request.

20. The method of claim 19 further comprising retransmitting the random access request using the identified subband-sequence pair in a second designated position of the designated subframe during a second transmission period if no response is received to the random access request transmitted during the first transmission period.

21. The method of claim 19 further comprising receiving a message designating at least one of the first and second positions for use for random access requests during the corresponding first and second transmission periods.

* * * * *